Jan. 3, 1939.     V. M. LYLE     2,142,905
DIRECTION INDICATOR
Original Filed Sept. 10, 1936     2 Sheets-Sheet 1

Inventor
V. M. Lyle
By L. F. Randolph
Attorney

Jan. 3, 1939.  V. M. LYLE  2,142,905

DIRECTION INDICATOR

Original Filed Sept. 10, 1936   2 Sheets—Sheet 2

Inventor
V. M. Lyle
By L. F. Randolph
Attorney

Patented Jan. 3, 1939

2,142,905

UNITED STATES PATENT OFFICE 2,142,905

DIRECTION INDICATOR

Vent Morgan Lyle, Bluefield, W. Va., assignor, by direct and mesne assignments, of one-fourth to Carl Mariotti, McComas, W. Va., and one-fourth to Roosevelt E. Rogers, Oak Hill, W. Va.

Application September 10, 1936, Serial No. 100,197
Renewed September 12, 1938

2 Claims. (Cl. 116—36)

This invention relates to a direction indicator adapted to be mounted upon an automobile or other vehicle and to be operable to apprize adjacent traffic of contemplated maneuvers, particularly, the direction of turning, the intention to back, start or stop and it further aims to provide a construction wherein the license tag will be elevated and out of normal position and lock therein when the vehicle is not in motion to serve as a signal or warning to law enforcement officers that the car has been stolen.

The more specific objects and advantages will become apparent from a consideration of the description following taken in connection with accompanying drawings illustrating an operative embodiment.

In said drawings:—

Figure 1:
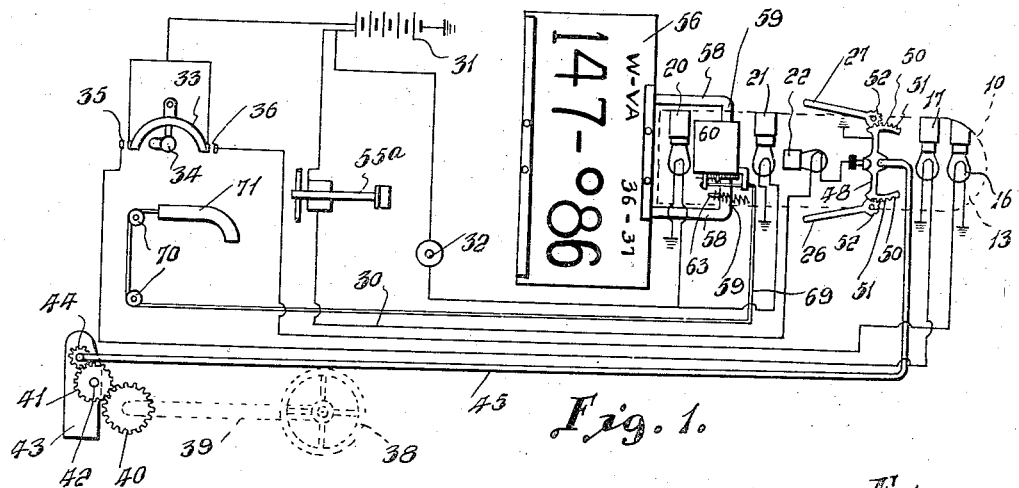
Figure 1 is a view showing the parts in diagram.

Referring specifically to the drawings wherein like reference characters designate like or similar parts, a suitable casing is provided as at 10 adapted for connection in any desired manner at the rear of an automobile or self-propelled vehicle. The casing may be of an appropriate shape and size and preferably has its rear wall 11 hinged to the remainder of the casing as at 12, on a vertical axis to permit opening and closing for acess to the interior or operating parts.

Adjacent the top, casing 10 has compartments at 13 and 14, partitioned from each other as at 15 and each containing an electric signaling lamp 16 and 17. Across the compartments 13 and 14, the wall or panel 11 respectively, has open letters or the like at 18 and 19, spelling "Start" and "Back up", or such letters may be delineated upon a panel which is transparent or translucent.

The casing 10 also has suitable chambers wherein a tail lamp 20, a stop lamp 21, and an arm illuminating lamp 22 are located. The tail lamp 20 is adapted to illuminate a red glass panel 23 in the panel or closure 11, the stop lamp 21, which is normally extinguished, is adapted to illuminate a red or other panel 24, preferably of glass, on which the word "Stop" may be delineated at 25.

Said lamp 22 is adapted to illuminate the casing adjacent direction indicating arms 26 and 27, the light rays being emitted laterally through glass or other windows 28 and 29 on the casing.

The lamps referred to are all located in a suitable electric circuit at 30, one side of which is grounded, and which circuit is energized by a storage battery or the equivalent 31.

Said lamps 20 and 22, that is the tail lamp and the illuminating lamp for the arm 26, are energized through the closing of an electric switch 32 in said circuit 30.

The closing of the circuit through the start and back up lamps 16 and 17, respectively, is controlled by an arm or bracket 33, carried rigidly on the gear shift lever 34 of the automobile, being the conventional type. The gear shift lever is moved into low position, which closes contact 35, to close a circuit through the battery 31 while if such gear shift lever is moved into reverse it closes the contact 36 and thus a circuit through the battery 31 and lamp 17. The contacts 35 and 36 are normally out of closed electric circuits.

Figure 2:
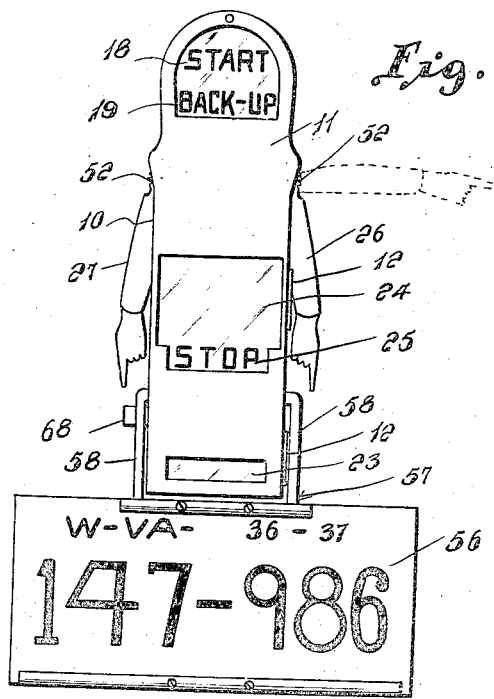
Figure 2 is a rear elevation of the direction indicator.
Figure 4:
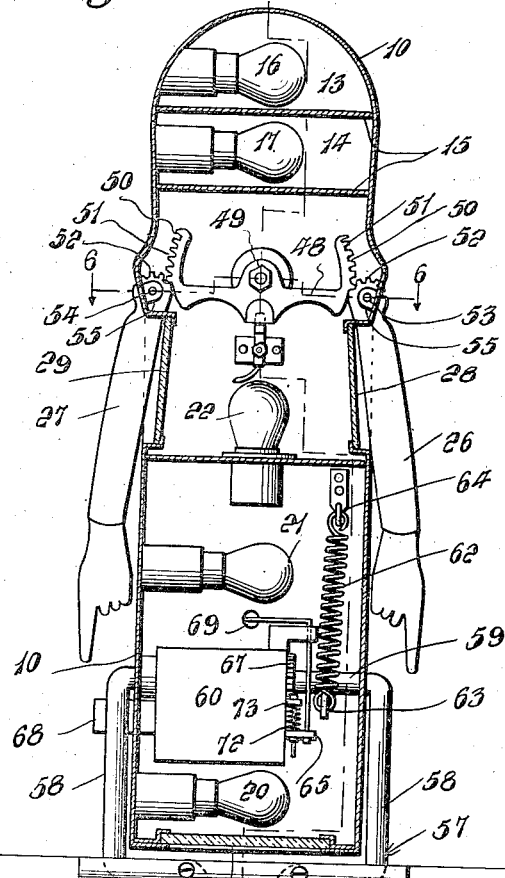
Figure 4 is an enlarged vertical sectional view taken through the direction indicator at a right angle to Figure 3.
Figure 4:
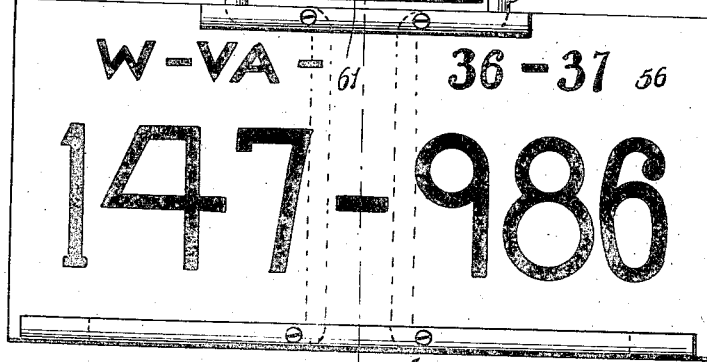
Figure 5:
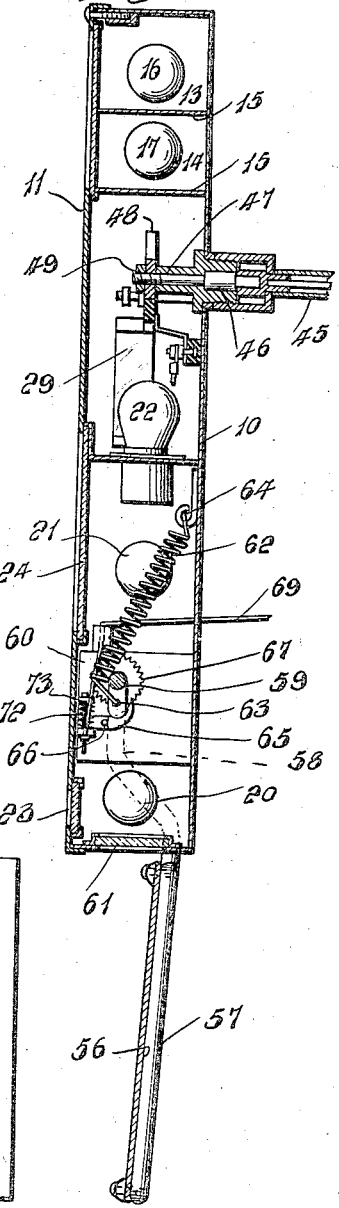
Figure 5 is a longitudinal sectional view taken on the line 5—5 of Figure 4.

The arms 26 and 27 are adapted to be moved from a vertical position at rest as in Figures 2 and 4, to a horizontal position as suggested in dotted lines in Figure 2, to indicate the direction of turning, through the movement of the steering mechanism of the automobile. To this end, the steering wheel of the automobile is diagrammatically suggested at 38 being rigid with the turnable steering post 39 on the lower end of which a gear wheel or pinion 40 is keyed. Said pinion is enmeshed with an intermediate gear or pinion 41, journaled on a stub shaft 42 carried by an auxiliary support 43. Said support 43 also journals a gear or pinion 44 which is connected to a flexible shaft or cable 45 which leads to and is connected detachably to a rigid shaft 46 suitably journaled at 47 to parts on the casing 10. Rigid with said element or rockshaft 46 is a gear 48, being keyed thereto and also fastened by means of screw threads and a nut 49 engaging the same. The gear member 48 has opposite racks or segments at 50 which are toothed at 51 and enmeshed with pinions or gear teeth 52 rigid with the indicator arms 26 and 27, which latter are journaled or pivoted as at 53 and 54 in brackets 55 rigid on the casing 10.

Thus it will be seen that when the steering wheel 38 is operated and the automobile turns to the right, the arm 26 will be moved to a horizontal position to indicate the intended turn while if the vehicle turns to the left, the arm 27 will be elevated to indicate the direction of turning.

The arms return to normal or depending position by gravity when the steering assumes a straight ahead position.

The stop light is suitably arranged in the circuit at 21 so as to illuminate the sign 24—25, upon stopping or when the brake is applied, through the actuation of the brake pedal in the conventional manner and which is suggested at 55a.

Another feature of the invention concerns the mounting of the license tag or plate. Such a license tag of conventional form is shown at 56, detachably carried by a plate or holder 57, in turn having arms 58 on opposite sides of the casing 10 joined by an arm 59 extending through and across the casing 10 and through a suitable key-control locking mechanism at 60. Such holder 57 and plate are normally and operatively in a substantially vertical position and illuminated from the lamp 29 through a transparent glass panel 61. Within the casing 10 is a contractile coil spring 62 fastened as at 63 to a crank on the arm 59 and at 64 to a bracket on the casing and tending to swing the holder 57 and license plate to the raised position shown in dotted lines in Figure 3. Normally the action of the spring 62 is overcome through the engagement of a pawl 65 pivoted at 66 in the casing and engaged with a ratchet or toothed element 67 rigid on the shaft 59.

In the normal position, one of the arms 58 abuts a stop at 68 to prevent undue rearward movement of the holder.

The latch or pawl 65 is under control of a draw cable or element 69 which is connected thereto and suitably trained for its movement as at 70 and at its free end provided with a handle 71 located adjacent the dashboard of the automobile.

Figure 3:
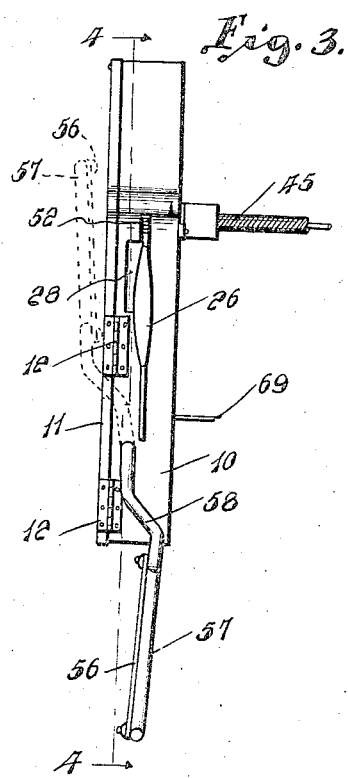
Figure 3 is a side elevation thereof.
Figure 6:
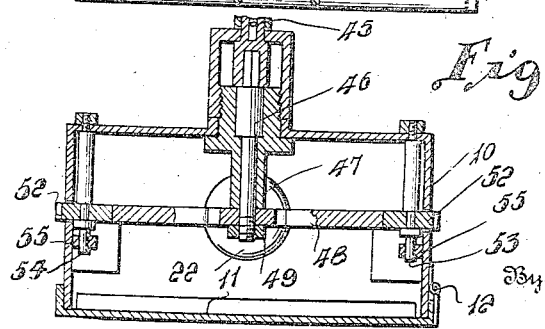
Figure 6 is a horizontal sectional view taken on the line 6—6 of Figure 4.

When the operator of the automobile is about to leave the same, as a protective measure, he pulls the handle 71, thereby releasing the latch 65 against the tension of the spring 72, and releasing the ratchet 67, the spring 62 thus being free to urge and move the holder 57 to the dotted line position of Figure 3. In moving to such position, coacting means, not specifically shown, between the lock 60 and arm 59, lock the holder 57 in the dotted line or elevated position of Figure 3. In this condition, should an unauthorized person attempt to operate the automobile, law enforcement officers will observe the lack of a license plate and realize that the car has been stolen or is being operated without authority. In fact, the rear surface of any surface of the holder 57 which is exposed in the dotted line position of Figure 3 may have information delineated thereon to the effect that the car is stolen or used without authority. The operator carries a key to the lock 60 and preparatory to resuming driving, he uses the key in the lock 60 to release the holder 57 which he moves downwardly by hand to the normal position, the latch 65 automatically engaging the ratchet 67. It will be noted that the spring 72 normally urges the latch 65 into engagement with the ratchet member 67 and that such spring is mounted by a bracket 73 attached to the lock 60.

Various changes may be resorted to provided they fall within the spirit and scope of the invention.

I claim as my invention:—

1. A direction indicator of the class described having a pair of indicating arms, a mounting, shafts on said mounting on which the arms are pivoted, a gear member on said mounting having teeth, teeth on said arms enmeshed with said gear member teeth, gearing means operable through the steering of an automobile including a flexible shaft connected to the gear member, said flexible shaft through its connection with the gearing means and gear member serving when operated to move the arms to retracted position and to turn the arms one at a time through rotation of the steering wheel in opposite directions from normal straight line position of the front wheels of an automobile.

2. A direction indicator of the class described having a pair of indicating arms, a mounting, shafts on said mounting on which the arms are pivoted, a gear member on said mounting having teeth, teeth on said arms enmeshed with said gear member teeth, gearing means operable through the steering of an automobile, and a flexible shaft operated by the gearing means and connected to the gear member, a rigid shaft journaled on the casing and carrying said gear member, and a detachable connection between said rigid shaft and said flexible shaft.

VENT MORGAN LYLE.